(12) United States Patent
Peddada

(10) Patent No.: US 7,702,947 B2
(45) Date of Patent: Apr. 20, 2010

(54) SYSTEM AND METHOD FOR ENABLING SITE FAILOVER IN AN APPLICATION SERVER ENVIRONMENT

(75) Inventor: Prasad Peddada, Fairfield, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 593 days.

(21) Appl. No.: 11/396,517

(22) Filed: Apr. 3, 2006

(65) Prior Publication Data

US 2007/0174660 A1 Jul. 26, 2007

Related U.S. Application Data

(60) Provisional application No. 60/740,528, filed on Nov. 29, 2005.

(51) Int. Cl.
*G06F 12/00* (2006.01)
(52) U.S. Cl. .............................. 714/4; 707/204; 714/11; 714/13; 714/15; 709/223
(58) Field of Classification Search ................. 714/13, 714/4
See application file for complete search history.

(56) References Cited

U.S. PATENT DOCUMENTS

| 6,108,300 | A  * | 8/2000  | Coile et al. ............... 370/217 |
| 6,587,970 | B1 * | 7/2003  | Wang et al. ................ 714/47 |
| 6,643,795 | B1   | 11/2003 | Sicola et al. |
| 6,757,708 | B1   | 6/2004  | Craig et al. |
| 7,007,042 | B2   | 2/2006  | Lubbers et al. |
| 7,392,421 | B1 * | 6/2008  | Bloomstein et al. ............ 714/4 |
| 2001/0049717 | A1 * | 12/2001 | Freeman et al. ............. 709/203 |
| 2002/0103816 | A1 * | 8/2002  | Ganesh et al. .............. 707/204 |
| 2002/0131423 | A1   | 9/2002  | Chan et al. |
| 2002/0161839 | A1 * | 10/2002 | Colasurdo et al. ........... 709/204 |
| 2002/0194324 | A1 * | 12/2002 | Guha ......................... 709/223 |
| 2003/0016770 | A1 * | 1/2003  | Trans et al. ................. 375/346 |
| 2003/0177411 | A1 * | 9/2003  | Dinker et al. ................ 714/13 |
| 2004/0044755 | A1   | 3/2004  | Chipman |
| 2004/0068572 | A1 * | 4/2004  | Wu ............................ 709/229 |
| 2004/0250248 | A1 * | 12/2004 | Halpern et al. ............. 718/100 |
| 2005/0021848 | A1 * | 1/2005  | Jorgenson ................... 709/238 |
| 2005/0033858 | A1 * | 2/2005  | Swildens et al. ........... 709/232 |
| 2005/0132154 | A1   | 6/2005  | Rao et al. |
| 2005/0193245 | A1 * | 9/2005  | Hayden et al. ................ 714/13 |

(Continued)

FOREIGN PATENT DOCUMENTS

GB 2407887 A * 5/2005

OTHER PUBLICATIONS

International Search Report and WO for PCTUS06/12413, Sep. 19, 2007, 5 pages.

(Continued)

*Primary Examiner*—Scott T Baderman
*Assistant Examiner*—Chae Ko
(74) *Attorney, Agent, or Firm*—Fliesler Meyer LLP

(57) ABSTRACT

A system and method for enabling site failover in an application server or clustered environment. In addition to providing HTTP session state replication across servers within a cluster, the invention provides the ability to replicate HTTP session state across multiple clusters. This improves high-availability and fault tolerance by allowing clusters to be spread across multiple geographic regions, power grids, and Internet service providers.

9 Claims, 5 Drawing Sheets

U.S. PATENT DOCUMENTS

| | | |
|---|---|---|
| 2005/0283641 A1 | 12/2005 | Clark et al. |
| 2005/0289152 A1* | 12/2005 | Earl et al. .................... 707/100 |
| 2006/0047776 A1* | 3/2006 | Chieng et al. ............... 709/217 |
| 2006/0107108 A1* | 5/2006 | Geng et al. ................... 714/11 |
| 2006/0112244 A1* | 5/2006 | Buah et al. .................. 711/162 |
| 2006/0143495 A1* | 6/2006 | Bozak et al. ................... 714/4 |
| 2006/0190766 A1* | 8/2006 | Adler et al. ................... 714/13 |
| 2006/0195560 A1 | 8/2006 | Newport |
| 2007/0100913 A1* | 5/2007 | Sumner et al. .............. 707/204 |

OTHER PUBLICATIONS

Notification of Transmittal of the International Search Report and the Written Opinion of the International Searching Authority, or the Declaration, Dated Oct. 18, 2006 in re PCT Application No. PCT/US06/12412.

* cited by examiner

SYSTEM AND METHOD FOR ENABLING SITE FAILOVER IN AN APPLICATION SERVER ENVIRONMENT

CLAIM OF PRIORITY

This application claims the benefit of U.S. Provisional Patent Application No. 60/740,528; entitled "SYSTEM AND METHOD FOR ENABLING SITE FAILOVER IN AN APPLICATION SERVER ENVIRONMENT"; inventor Prasad Peddada; filed Nov. 29, 2005, and incorporated herein by reference.

CROSS-REFERENCE TO RELATED APPLICATIONS

This application is related to U.S. patent application "SYSTEM AND METHOD FOR PROVIDING SINGLETON SERVICES IN A CLUSTER"; Inventor: Prasad Peddada; Ser. No. 11/396,826; Filed Apr. 4, 2006, and subsequently issued on Nov. 4, 2008 as U.S. Pat. No. 7,447,940, which claims the benefit of U.S. provisional patent application "SYSTEM AND METHOD FOR PROVIDING SINGLETON SERVICES IN A CLUSTER"; Inventor: Prasad Peddada; Ser. No. 60/736,718; Filed Nov. 15, 2005, both of which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers, networked computers, and clusters of computers, and particularly to a system and method for enabling site failover in an application server or clustered environment.

BACKGROUND

In recent years, with increased use of enterprise computing and services, companies have desired to provide computing facilities in various geographical locations for better performance. Furthermore, to better prepare for potential natural or man-made disasters, companies have desired to co-locate important data in different locations so that if the facilities at one location are damaged, another location is available to continue working.

In large organizations, clusters of computers are often used. A cluster is typically a network of two or more clusters or sets of computer nodes, each of which are essentially identical, and each of which provide the same services or resources. The nodes are grouped together to form a centrally-accessible set of resources. Since each node in a cluster is essentially identical, when one cluster node fails while performing a task or providing a service, another node in the cluster can automatically take over providing that service.

More recently, application server customers have expressed a desire to provide failover services across two or more clusters for HTTP sessions. With traditional systems, the only workaround technique available for providing failover across clusters has been to use a third-party solution, such as Java Database Connectivity (JDBC) persistence. In this workaround, customers were forced to use JDBC persistence along with a third-party database solution such as Veritas' Volume Replicator product, or EMC's Symmetrix Remote Data Facility, to replicate session state from one site to another (by writing session information through JDBC to the database, replicating the database across the sites, and reading the session information back, again through JDBC). However, the need to integrate these different technologies from multiple vendors is not satisfactory from a performance or reliability standpoint.

What is needed therefore are solutions for those application server customers who need high availability across clusters, and across multiple geographic locations, while also requiring high performance for HTTP sessions.

SUMMARY

As disclosed herein, the invention provides a system and method for enabling site failover in an application server or clustered environment. In addition to providing HTTP session state replication across servers within a cluster, the invention provides the ability to replicate HTTP session state across multiple clusters. This improves high-availability and fault tolerance by allowing clusters to be spread across multiple geographic regions, power grids, and Internet service providers.

DETAILED DESCRIPTION

Figure 1:
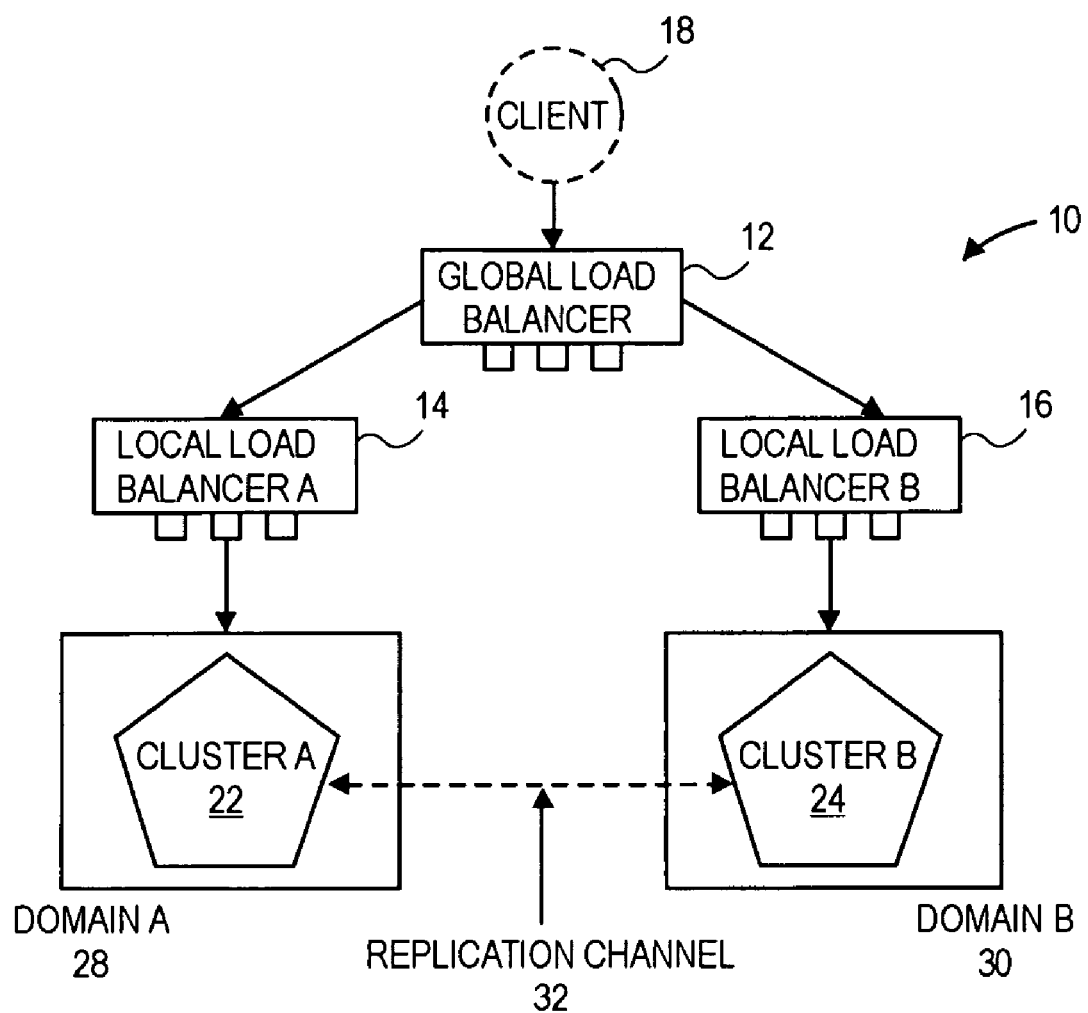
FIG. 1 shows an illustration of a system for enabling site failover in an application server environment, in accordance with an embodiment of the invention.

As disclosed herein, the invention provides a system and method for enabling site failover in an application server or clustered environment. In addition to providing HTTP session state replication across servers within a cluster, the invention provides the ability to replicate HTTP session state across multiple clusters. This improves high-availability and fault tolerance by allowing clusters to be spread across multiple geographic regions, power grids, and Internet service providers.

In a traditional system, each server in the cluster replicates the session state to another server within the cluster. Within either a metropolitan area network (MAN), or a large area network (LAN), a technique referred to as MAN Hypertext Transfer Protocol (HTTP) Session State Replication provides a way for application server customers to replicate state across clusters. This is particularly useful when the customers would like to set up primary and secondary servers on opposite sides of, for example, a street, or other physical dividing line. The traditional design forces customers to set up servers on both sides of this dividing line to be in the same cluster. However, research has shown that, because of security considerations, customers do not like to set up their routers to propagate multicast traffic. As a result they cannot replicate across the physical dividing line that separates the MAN into two LANS. Customers would like to be able to keep each cluster completely isolated, for example, each cluster operating on a different power grid, or using a different Internet Service Provider (ISP), so as to provide higher availability without having to sacrifice performance. As disclosed herein, a new MAN HTTP session replication feature allows customers to do so.

Furthermore, when using a traditional system, application server customers with requirements to fail-over session state across data centers must typically rely on a combination of JDBC persistence (which is synchronous so that the system remains consistent), and third-party products, to replicate the database table across clusters geographically separated by perhaps several hundred miles within a wide area network (WAN), a technique referred to as WAN HTTP Session State Replication. Due to the need for synchronous writes, the JDBC session persistence scheme is significantly slower than in-memory replication. However, research has shown that customers would be willing to tolerate a slightly larger failure window, if in turn they could get WAN session replication that performs better than the synchronous JDBC solution. As disclosed herein, a new WAN HTTP session replication feature uses in-memory replication within a cluster, and in addition allows each server to asynchronously persist state to a database in the secondary cluster. Since the persistence to the database is performed asynchronously for WAN replication, the system performance is comparable to that of in-memory replication, while also being suitable for WAN replication. Unlike traditional techniques, the feature is compatible with third-party products for data replication, but does not require them.

An administrator can pick one among the two session replication schemes based on their particular network configuration.

FIG. 1 shows an illustration of a system for enabling site failover in an application server environment, in accordance with an embodiment of the invention. As shown in FIG. 1, the system 10 includes a global local balancer (GLB) 12, together with one or more local load balancers 14, 16. The load balancers receive requests from a client 18, and communicate the requests to a server in one or more clusters 22, 24. The clusters may be in different computing domains 28, 30. A replication channel 32 allows session state information to be communicated from a first to a cluster to a secondary cluster (for example, from a primary to a secondary cluster), to support cross-cluster replication in a multi-cluster environment. These features are described in further detail below. FIG. 1 illustrates separate global load balancers and local load balancers. However, in some embodiments the global load balancer may also act as, or incorporate the local load balancer, and similarly, in some embodiments one of the local load balancers may act as the global load balancer, so that the system can be implemented with just two load balancers.

Global Load Balancer—In a network configuration that supports cross-cluster replication, the global load balancer is responsible for balancing HTTP requests across the clusters. When a request is received from a client, the global load balancer determines which cluster to send it to, based on the current number of requests being handled by each cluster. The request is then passed to the local load balancer for the chosen cluster. In some embodiments the global load balancer may also act as, or incorporate the local load balancer.

Local Load Balancer—The local load balancer receives HTTP requests from the global load balancer, and is responsible for load balancing HTTP requests across the servers within a cluster.

Replication Channel—In order to replicate session data from one cluster to another, in accordance with an embodiment a replication channel is configured to communicate session state information from a primary cluster to a secondary cluster. The specific method used to replicate session information depends on which type of cross-cluster replication is to be implemented, i.e. Metropolitan Area Network (MAN) cross-cluster replication, or Wide Area Network (WAN) cross-cluster replication, each of which are discussed in further detail below. In accordance with some embodiments, a special replication channel is not used; the session state information is instead communicated directed between the clusters, or by using a general channel.

Failover—When a particular server within a cluster fails, the local load balancer is responsible for transferring the request to other servers within a cluster. When an entire cluster fails, the local load balancer informs the global load balancer not to send any further requests, which effectively redirects HTTP requests back to the global load balancer. The global load balancer then directs the requests to the secondary or backup local load balancer.

MAN Replication Across Clusters

Resources within a metropolitan area network (MAN) are often in physically separate locations, but are geographically close enough that network latency is typically not an issue. As such, load balancing within a MAN is often geared towards balancing the numbers of requests over the available clusters. Network communication in a MAN generally exhibits low latency and fast interconnect. Clusters within a MAN can be installed in physically separate locations which improves availability. To provide failover within a MAN, an embodiment of the present invention provides an in-memory mechanism that works between two separate clusters. This allows session state to be replicated synchronously from one cluster to another, provided that the network latency is of the order of a few milliseconds. The advantage of using a synchronous method is that the MAN is more reliable; there is no affect on performance; and there is improved reliablity for site failures.

Figure 2:
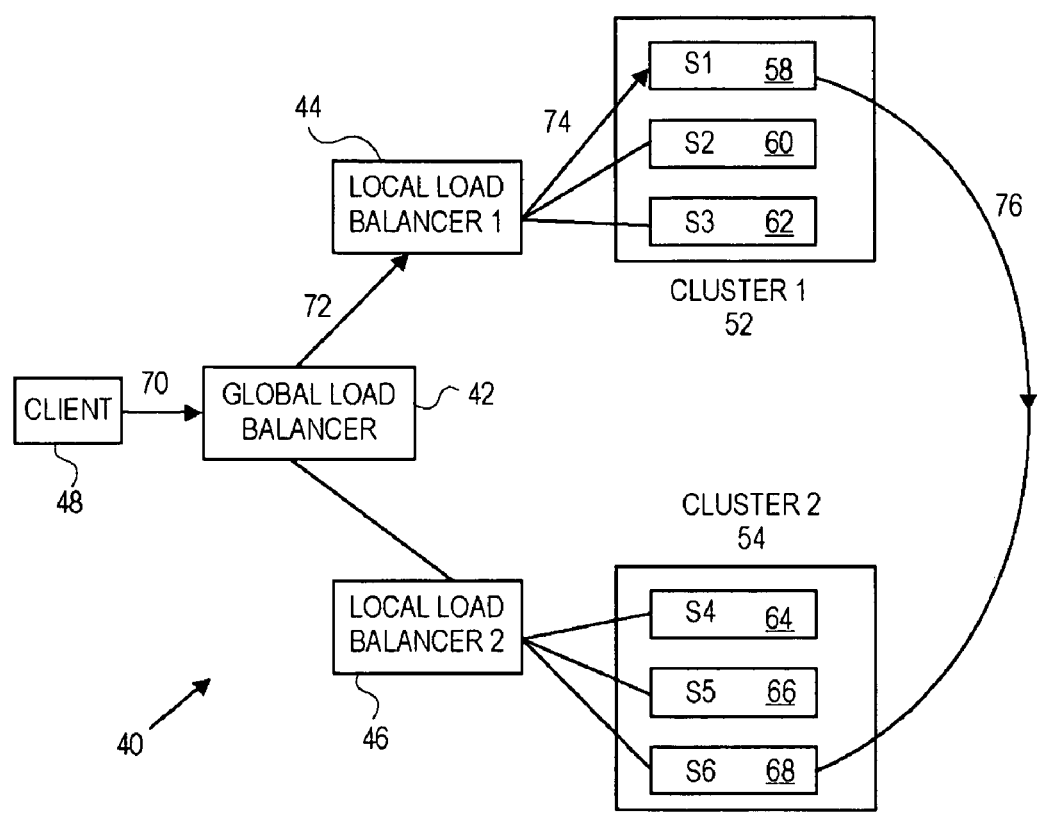
FIG. 2 shows an illustration of a system for cluster failover between metropolitan area networks (MANs) or local area networks (LANs), in accordance with an embodiment of the invention.

FIG. 2 shows an illustration of a system for cluster failover between metropolitan area networks (MANs) or local area networks (LANs), in accordance with an embodiment of the invention. As shown in FIG. 2, the system 40 includes a global local balancer 42, together with one or more local load balancers 44, 46 indicated respectively as "Local Load Balancer 1" and "Local Load Balancer 2". The load balancers receive requests from a client 48, and communicate the requests to a server in one of the clusters 52, 54. In the example shown in FIG. 2, a first cluster 52, indicated as "Cluster 1", includes three servers 58, 60, 62 or cluster nodes; while a second cluster 54, indicated as "Cluster 2", also includes three servers 64, 66, 68. Depending on the embodiment, a different number of clusters and/or servers within a cluster, could be used.

During MAN replication, a client makes a request 70 which passes through the global load balancer. The global load balancer passes 72 the request to a local load balancer, typically based on current system load. In this example, the session request is passed to local load balancer 1. The local load balancer in turn passes 74 the request to a server within a cluster, again typically based on system load, in this example server S1. Once the request reaches server S1, this managed server becomes the primary server for this HTTP session. This server will handle subsequent requests assuming there are no failures. After the server establishes the HTTP session, the current session state is replicated 76 to a designated secondary server.

MAN replication relies on global load balancers to maintain cluster affinity, and local load balancers to maintain server affinity. If a server within a cluster fails, then the local load balancer is responsible for failing-over that request and load balancing to another server in the cluster. If all of the servers within a cluster have failed or are unavailable, then the global load balancer is responsible for failing-over that request and load balancing to another cluster. This ensures that failover to another secondary cluster does not occur unless the entire primary cluster fails.

Once a client establishes a connection through a load balancer to a cluster, then the client should maintain stickiness to that cluster as long as it is healthy. In accordance with an embodiment, this information is stored in an HTTP session cookie.

MAN Failover Scenarios

The following sections describe various failover scenarios based on the MAN configuration in FIG. 2, in accordance with an embodiment of the invention.

Failover Scenario 1—If all of the servers in cluster 1 fail, then the global load balancer will automatically fail all subsequent session requests to cluster 2. All sessions that have been replicated to cluster 2 will be recovered and the client will experience no data loss.

Failover Scenario 2—In this instance the primary server S1 is being hosted in cluster 1, and the secondary server S6 is being hosted in cluster 2. If S1 crashes, then any other server in cluster 1 (S2 or S3) can pick up the request and retrieve the session data from server S6. Server S6 will continue to be the backup server.

Failover Scenario 3—In this instance the primary server S1 is being hosted in cluster 1, and the secondary server S6 is being hosted in cluster 2. If the secondary server S6 fails, then the primary server S1 will automatically select a new secondary server in cluster 2. Upon receiving a client request, the session information will be backed up on the new secondary server.

Failover Scenario 4—If the communication between the two clusters fails, then the primary server will automatically replicate session state to a new secondary server within the local cluster. Once the communication between the two clusters is enabled, subsequent client request states will be replicated on the remote cluster.

Failover Scenario 5—In this instance the primary is being hosted by server S1 in cluster 1 and the secondary is hosted by server S4 in cluster 2. If servers 1 crashes, and any of the load balancers fails the request to the second cluster, then any server (S4, S5, S6) can handle the request. If the load balancer redirects the request to the actual secondary, then the secondary will become the new primary and choose a new secondary server in cluster 1 among S2 and S3. If the request doesn't get redirected to the correct secondary in cluster 2, then the third server (either S5, or S6) will copy the session from the original secondary server (S4) in cluster 2, and create a new secondary in cluster 1.

Failover Scenario 6: If the requests are redirected to the wrong server, then the system attempts to salvage the session from primary or secondary server depending on the availability of the servers. Attempts can be made to clean up the session state on any old primary and secondary servers for efficiency reasons.

Table 1 included in Appendix A lists some additional MAN events that may happen in the MAN replication environment, together with possible contexts, and the probable or configured outcome.

WAN Replication Across Clusters

Resources in a wide area network (WAN) are frequently spread across separate geographical regions. In addition to requiring network traffic to cross long distances, these resources are often separated by multiple routers and other network bottle necks. As such, load balancing within a WAN is often geared towards balancing requests that are best handled by clusters in their appropriate geographic region. When compared to a MAN or LAN, network communication in a WAN generally has a higher latency and slower interconnect. Slower network performance within a WAN makes it difficult to use a synchronous replication mechanism such as the one described as can be used with a MAN. Instead, an embodiment of the present invention provides failover across clusters in a WAN by using an asynchronous data replication scheme.

Figure 3:
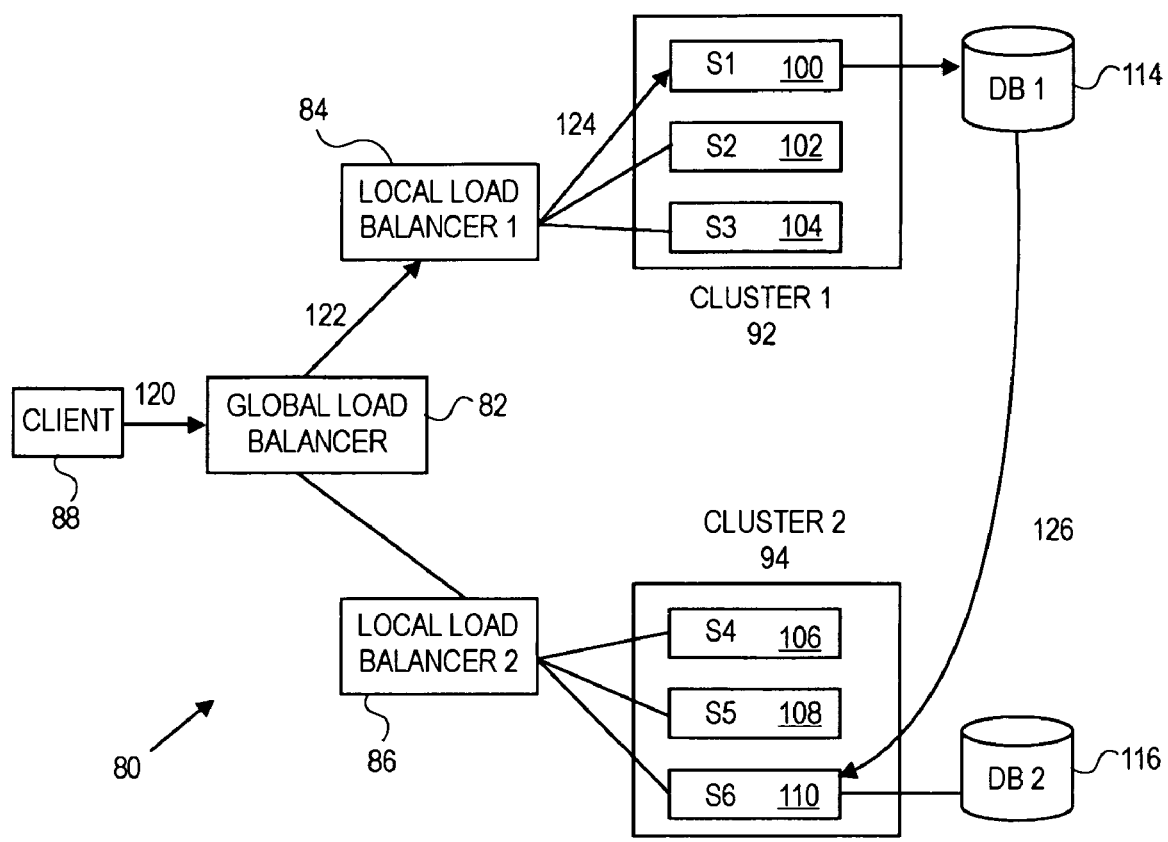
FIG. 3 shows an illustration of a system for cluster failover within a wide area network (WAN), in accordance with an embodiment of the invention.

FIG. 3 shows an illustration of a system for cluster failover within a wide area network (WAN), in accordance with an embodiment of the invention. As shown in FIG. 3, the system 80 includes a global local balancer 82, together with one or more local load balancers 84, 86 indicated respectively as "Local Load Balancer 1" and "Local Load Balancer 2". The load balancers receive requests from a client 88, and communicate the requests to a server in one of the clusters 92, 94. In the example shown in FIG. 2, a first cluster 92, indicated as "Cluster 1", includes three servers 100, 102, 104 or cluster nodes; while a second cluster 94, indicated as "Cluster 2", also includes three servers 106, 108, 110. Depending on the embodiment, a different number of clusters and/or servers within a cluster, could be used. Each cluster optionally has a database or HTTP session store 114, 116 associated therewith, indicated as "DB1" and "DB2" respectively, for storing session replication information.

During WAN replication, a client makes a request 120 which passes through the global load balancer. The global load balancer passes 122 the request to a local load balancer, typically based on current system load, geographic location, or a combination of these and other factors. In this example, the session request is passed to local load balancer 1. The local load balancer in turn passes 124 the request to a server within a cluster, again typically based on system load, in this instance server S1. Once the request reaches S1, this managed server becomes the primary server for this HTTP session. This server will handle subsequent requests assuming there are no failures. After the server establishes the HTTP session, the current session state is replicated 126 to the designated secondary server.

The asynchronous data replication scheme uses in-memory replication within a first cluster and periodically (using for example, a flush-timeout, or number of requests) makes a remote request to a backup second cluster to persist the session state to the database. The clients block for in-memory session replication to the secondary server in the cluster, and do not block to persist state to the database. The database is not used as a data transfer mechanism; it merely serves as a local session data store in the respective clusters. Requests are made periodically, since the latency between clusters is too expensive to do synchronous replication.

If both the primary and secondary server crash at the same time, updates made to the session since the last flush period will be lost. If the communication link between two clusters fail, data replication across sites will be temporarily interrupted. However, once the communication link comes backup, all the pending data replication requests will be completed.

In accordance with an embodiment, after state is persisted locally, third-party database solutions such as those from EMC or Veritas can be used to replicate the session data across clusters. By default, however the inter-cluster session state transfer will be handled by the application servers themselves, without a need for third-party solutions. In accordance with an embodiment, all primary servers in the cluster are responsible for flushing the session state to persistent store periodically. Once a client establishes a session in cluster 1, the load balancer should not fail over the request to cluster 2, unless cluster 1 is unavailable.

WAN Failover Scenarios

The following sections describe various failover scenarios based on the WAN configuration in FIG. 3, in accordance with an embodiment of the invention.

Failover Scenario 1—If all of the servers in cluster 1 fail, then the global load balancer will automatically fail all subsequent session requests to cluster 2. Sessions are recoverable up to the last known flush to the database or HTTP session store. The flush timeout represents the timeout difference between in-memory replication and database-based replication.

Failover Scenario 2—In this instance, the primary server S1 is being hosted in cluster 1, and the secondary server S2 is also being hosted in cluster 1. If server S1 crashes, then S2 will become the new primary server. The session state will be backed up on a new secondary sever.

Failover Scenario 3—In this instance, the primary is being hosted by a first Server S1 in cluster 1 and the secondary is hosted by Server S3 in cluster 1. If server S1 crashes, and the request gets redirected to server S2, server S2 will become the new primary and the state will be backed on a new secondary server.

Failover Scenario 4—In this instance the primary is being hosted by Server S1 in cluster 1, and the secondary is hosted by Server S3, also in cluster 1. If the load balancer sends the request to server S2 instead of S1, server S2 copies the session from the primary server and creates a backup session on a secondary server. Server S2 will also remove the session from server S1 and S3.

Table 2 included in Appendix A lists some additional WAN events that may happen in the WAN replication environment, together with possible contexts, and the probable or configured outcome.

Typical MAN and WAN Implementations

As described above, depending on their particular network configuration, an administrator can pick one among the two session replication schemes as desired.

Figure 4:
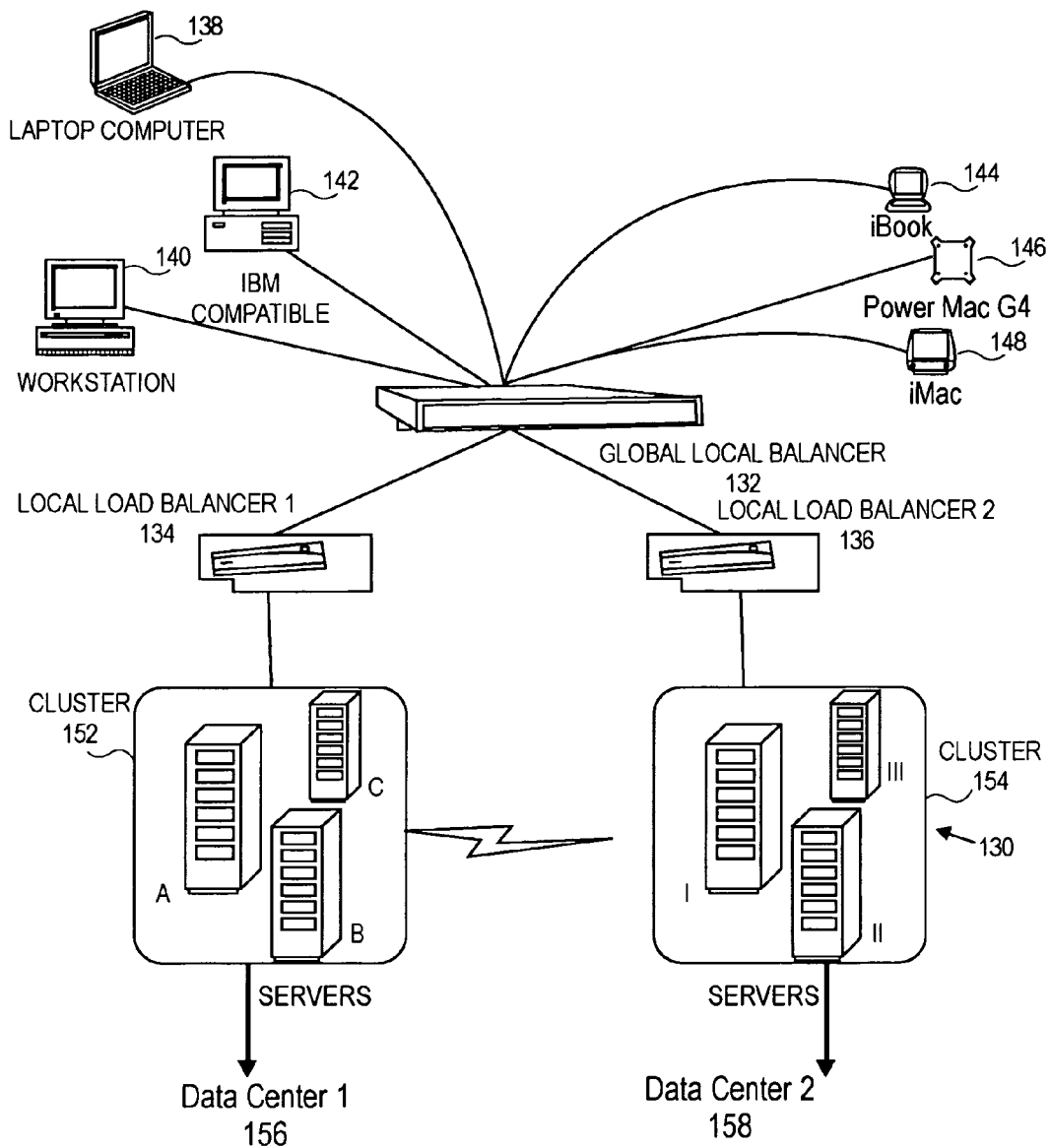
FIG. 4 shows an illustration of an example implementation of cluster failover between MANs/LANs, in accordance with an embodiment of the invention.

FIG. 4 shows an illustration of an example implementation of cluster failover, in accordance with an embodiment of the invention, wherein the MAN session replication scheme is used. As shown in FIG. 4, the environment 130 includes a global local balancer 132, together with one or more local load balancers 134, 136, that receive requests from clients, including any of a laptop computer 138, workstation 140, personal computer 142, iBook 144, PowerMac 146, iMac 148, or other computing device, and communicate the requests to a server in one or more clusters 152, 154, at two different data center locations 156, 158 respectively. In this example, the MAN HTTP session replication feature is configured.

Figure 5:
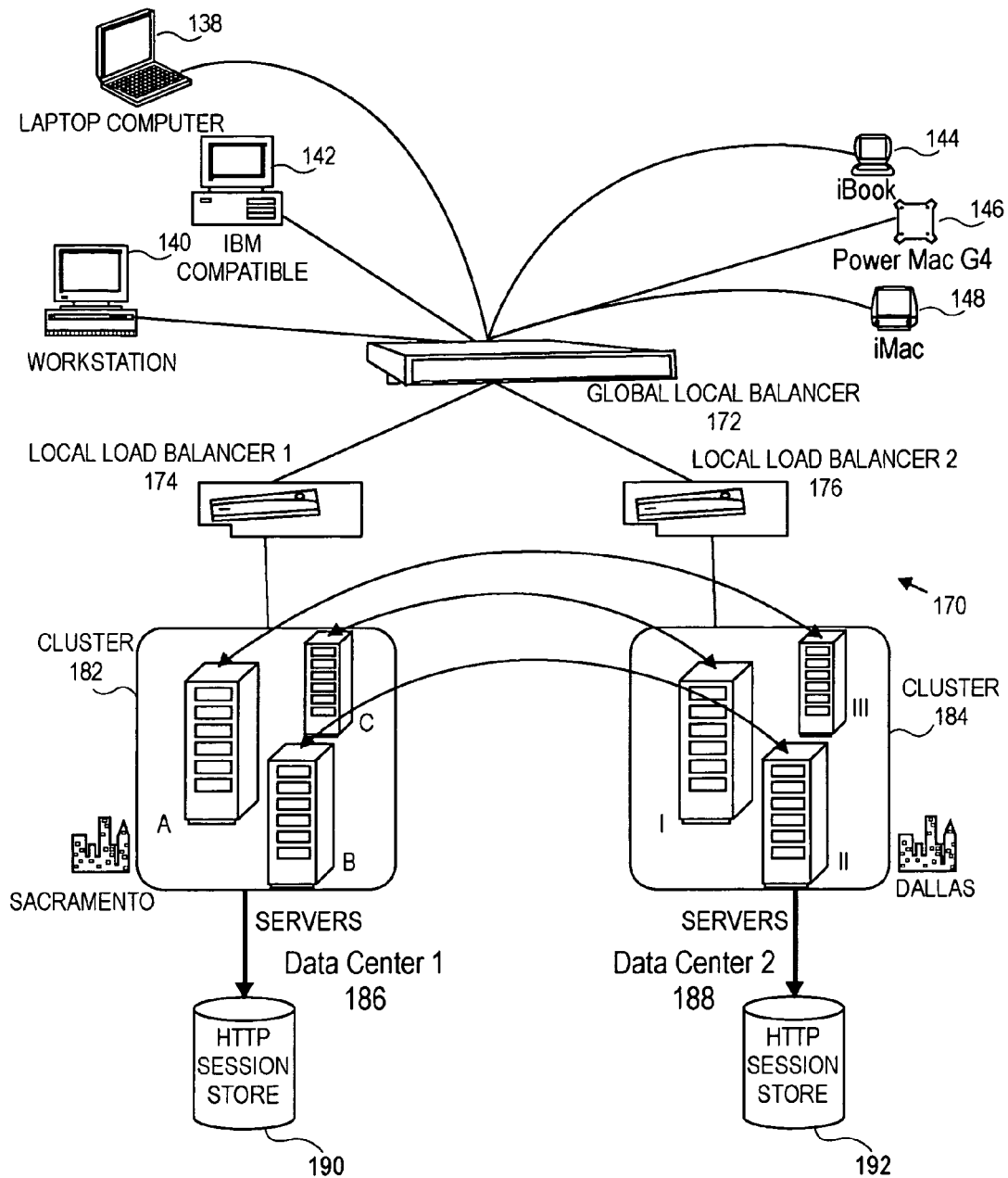
FIG. 5 shows an illustration of an example implementation of cluster failover within a WAN, in accordance with an embodiment of the invention.

FIG. 5 shows an illustration of an example implementation of cluster failover, in accordance with an embodiment of the invention, wherein the WAN session replication scheme is used. As shown in FIG. 5, the environment 170 includes a global local balancer 172, together with one or more local load balancers 174, 176, that again receive requests from clients, including any of a laptop computer 138, workstation 140, personal computer 142, iBook 144, PowerMac 146, iMac 148, or other computing device, and communicate the requests to a server in one or more clusters 182, 184, at two different data center locations 186, 188 respectively. Each data center is also associated with a database or HTTP session store 190, 192. In this example, the WAN HTTP session replication feature is configured, which allows the two clusters to be very far apart geographically, for example one in Sacramento and the other in Dallas, while still retaining HTTP session replication and failover.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMS, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic environment, other application servers, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

APPENDIX A

The following tables list additional MAN and WAN events that may occur, depending on the particular replication environment chosen by the administrator, together with contexts, and the probable or configured outcome.

TABLE 1

MAN Event Table.

| No. | Event in Cluster 1 | Context | Action triggered in Cluster 2 |
|---|---|---|---|
| 1 | Add a new server to a cluster | Cluster 1 & 2 are running. | Servers in cluster 2 will recognize the new server in the cluster and all the servers will reset their secondary server and reelect a new secondary server. |
| 2 | | Cluster 2 is not running/suspended/MAN Link Down | Servers in the local cluster will reelect their new secondary server. |
| 3 | Server in the cluster hangs | | Servers in cluster 2 will recognize the a server dropped out of the cluster and servers will reelect the secondary server. |
| 4 | Start first server in the cluster | Second Cluster is running | One server in the second cluster will select this server as its backup |
| 5 | Stop a server in the cluster | | Servers in cluster 2 will recognize that a server dropped out of the cluster and servers will reelect the secondary server. |
| 6 | Delete a server | | No effect as the operation is allowed only on a server that is not running. |
| 7 | Inter cluster network connection | Partition (MAN Link Down) | Servers in a cluster will start replicating to servers within the local cluster upon receiving a request from the client. Servers will also log message when they are replicating to a server in the local cluster. |
| 8 | | Restored | Upon receiving request from the client, servers will start replicating the sessions to the cluster 2 and delete the secondary from the secondary server in the local cluster. |
| 9 | Request creates a session on a server | MAN Link is Up | Secondary is created in cluster 2. and state is copied via MAN link |
| 10 | Request creates a session on a server | MAN Link is Down | Secondary is created in cluster 1. |
| 11 | Request served by the server hosting the primary session | MAN Link is Up | Secondary session in cluster 2 will be updated |
| 12 | Request served by the server hosting the primary session | MAN Link is Down | Secondary session will created if it doesn't exist in cluster 1 or update the secondary if it exists. |
| 13 | Request gets redirected to a server other than primary/secondary | Primary is alive/Secondary is alive and is reachable | Session will be copied from primary server and the current server will take over as primary and a new will be created. If the request gets redirected to a server in cluster 2, the new primary server will be in cluster 2 and new secondary server will be cluster 1 and vice versa if the request gets redirected a server in cluster 1. Session on the old primary/secondary server will be deleted. |
| 14 | | Primary is dead or unreachable/Secondary is alive and reachable | Session will be copied from secondary server and current server will takeover as the primary and create a new secondary server. Depending on the MAN Link, the secondary will be created in the back cluster or the same cluster. |
| 15 | | Primary/Secondary dead or unreachable | Lose session |
| 16 | Request gets redirected to secondary server | Primary is alive and reachable (MAN Link Up) | Primary and Secondary servers will swap roles |
| 17 | | Primary is alive and unreachable(MAN Link Down) | Secondary will take over as primary server and create a secondary in the cluster 2.. |
| 18 | | Primary is dead | Secondary server will take over as primary and will create a new secondary. |
| 19 | Entire cluster is shutdown/crashed | | GLB should failover the request to cluster 2 and a server will take over as primary for the requested session without any loss of sessions |
| 20 | Local Load balancer fails | Inter cluster communication is up | Same as #13 |
| 21 | | Inter cluster communication is down | Same as #14 |

TABLE 1-continued

MAN Event Table.

| No. | Event in Cluster 1 | Context | Action triggered in Cluster 2 |
|---|---|---|---|
| 22 | Communication failures between GLB & Local Load balancer | Failure between one Local Load Balancer & GLB | After the GLB fails the request over to cluster 2, the behavior is same as #13 if the inter cluster communication link is up and the behavior will be same as #14 if the link is down. |
| 23 | | Failure between both Local Load Balancers and GLB | Tough luck |
| 24 | Communication failure between Local Load Balancer & the Cluster | Inter cluster communication is up | After the GLB fails the request over to cluster 2, the behavior is same as #13 |
| 24 | | Inter cluster communication is down | After the GLB fails the request over to cluster 2, the behavior is same as #14 |
| 25 | GLB fails | | Tough luck if there is no backup GLB. |

TABLE 2

WAN Event Table.

| No. | Event in Cluster 1 | Context | Action Triggered in Cluster 2 |
|---|---|---|---|
| 1 | Add a new server to a cluster | Cluster 1 & 2 are running. | Servers in cluster 1 will reelect their secondary server and no change in cluster 2. |
| 2 | | Cluster 2 is not running/suspended | Updates to the secondary cluster will not be propagated until the second cluster comes alive. |
| 3 | Server (A) hangs | | Servers will reelect the secondary server in cluster 1. Servers in cluster 2 that are using A to persist state will choose a different server in cluster 1. |
| 4 | Stop a server in the cluster | | Servers will recognize that a server dropped out of the cluster and servers will reelect a new secondary server |
| 5 | Delete a server | | No effect as the operation is allowed only on a server that is not running. |
| 6 | Inter cluster network connection | Partition (WAN Link is up) | Servers will log a message and the server will add the state to the pending update list. |
| 7 | | Restored (WAN Link is down) | All the pending updates will be flushed on link restoration |
| 8 | Request creates a session on a server | WAN Link is Up | Creates secondary a server in cluster 1 and register the session for batched update to cluster 2. |
| 9 | Request creates a session on a server | WAN Link is Down | Creates secondary a server in cluster 1 and register the session for batched update to cluster 2. |
| 10 | Request served by the server hosting the primary session | WAN Link is Up | Create/Update session on secondary in cluster 1 and register the session for batched update to cluster 2 |
| 11 | Request served by the server hosting the primary session | WAN Link is Down | Create/Update session on secondary in cluster 1 and register the session for batched update to cluster 2 |
| 12 | Request gets redirected to a server other than primary/secondary | Primary is alive/Secondary is alive | Session will be copied from primary server and new secondary will be created. Session on the old primary/secondary server will be delete. |
| 13 | | Primary is dead or unreachable/Secondary is alive | Session will be copied from secondary server and current server will takeover as the primary. |
| 14 | | Primary/Secondary dead or unreachable | Lose session |
| 15 | Request gets redirected to secondary server | Primary is alive | Primary and Secondary servers will swap roles |
| 16 | | Primary is dead | Secondary server will take over as primary and will create a new secondary. |
| 17 | Entire cluster is shutdown/crashed | | GLB should failover the request to cluster 2 and a server will take over as primary after fetching the state from the database. |

TABLE 2-continued

WAN Event Table.

| No. | Event in Cluster 1 | Context | Action Triggered in Cluster 2 |
|---|---|---|---|
| 18 | Request gets redirected to cluster 2 | Inter cluster communication link is up | Send redirect to the client. |
| 19 | | Inter cluster communication link is down | Salvage the session from the database. |
| 20 | Local Load balancer fails | Inter cluster communication is up/down | Customers should have backup load balancers so that this doesn't happen. If the request fails over to cluster 2, client might get stale data. |
| 21 | Communication failures between GLB & Local Load balancer | Failure between one Local Load Balancer & GLB | Same as #20 |
| 22 | | Failure between both Local Load Balancers and GLB | Tough luck |
| 23 | Communication failure between Local Load Balancer & the Cluster | Inter cluster communication is up/down | Same as #20 |
| 24 | GLB fails | | Tough luck if there is no backup GLB. |

What is claimed is:

1. A system for enabling site failover in an application server or clustered environment, comprising:
a first cluster, including a first plurality of servers executing therein that processes requests, and having a first local load balancer associated therewith that forwards session requests within the first cluster;
a second cluster, including a second plurality of servers executing therein that processes requests, and having a second local load balancer associated therewith that forwards session requests within the second cluster;
a replication channel provided between the first cluster and the second cluster, which is configured to communicate, prior to failover, session state information between servers in the first cluster and servers in the second cluster;
a global load balancer for distributing the session requests to the first and second clusters via their corresponding first and second local load balancers;
wherein, when a session is requested, a primary server is selected from the first plurality of servers in the first cluster to handle requests within the session, and wherein the primary server establishes the session and subsequently, prior to failover, replicates current session information to a secondary server selected from the second plurality of servers in the second cluster, via the replication channel, for use in enabling site failover between the plurality of clusters;
wherein, for a particular session, each of the global, first local, and second local load balancers maintains affinity for subsequent requests within the particular session to its primary server, to ensure that the subsequent requests are not transferred to another server in the same cluster, or from one cluster to another cluster, unless a site failover occurs; and
wherein
if the system is configured for use in a metropolitan area network (MAN), the plurality of clusters are distributed on a MAN wherein the session is an HTTP session, and wherein the replication channel uses an in-memory replication that operates between the first cluster and the second cluster, and allows HTTP session state to be replicated synchronously from the first cluster to the second cluster, and
if the system is configured for use in a wide area network (WAN), the plurality of clusters are distributed on a WAN wherein each of the plurality of clusters has a database associated therewith, that includes session information stored therein, which the replication channel then uses to provide failover across the plurality of clusters using asynchronous data replication at periodic intervals.

2. The system of claim 1, wherein, once a request reaches a particular one of the servers in either the first cluster or the second cluster, the particular server becomes the primary server for that session, and the particular server handles subsequent requests assuming there are no failures, and wherein, after the server establishes the session, the current session state is replicated to a designated secondary server in another cluster.

3. The system of claim 1, wherein, once a client establishes a connection to a cluster, then the client maintains stickiness to that cluster, using information stored in a cookie at the client.

4. The system of claim 1, wherein the session is an HTTP session, and wherein during WAN replication, once the request a particular one of the servers in either the first cluster or the second cluster, the particular server becomes the primary server for that HTTP session, and the particular server handles subsequent requests assuming there are no failures, and wherein, after the server establishes the HTTP session, the current session state is replicated to a designated secondary server.

5. A method for enabling site failover in an application server or clustered environment, comprising the steps of:
providing a system including a first cluster, including a first plurality of servers executing therein that processes requests, and having a first local load balancer associated therewith that forwards session requests within the first cluster;
providing a second cluster, including a second plurality of servers executing therein that processes requests, and having a second local load balancer associated therewith that forwards session requests within the second cluster;

providing a replication channel provided between the first cluster and the second cluster, which is configured to communicate, prior to failover, session state information between servers in the first cluster and servers in the second cluster;

providing a global load balancer for distributing the session requests to the first and second clusters via their corresponding first and second local load balancers; and replicating information across the clusters, wherein, when a session is requested, a primary server is selected from the first plurality of servers in the first cluster to handle requests within the session, and wherein the primary server establishes the session and subsequently, prior to failover, replicates current session information to a secondary server selected from the second plurality of servers in the second cluster, via the replication channel, for use in enabling site failover between the plurality of clusters;

wherein, for a particular session, each of the global, first local, and second local load balancers maintains affinity for subsequent requests within the particular session to its primary server, to ensure that the subsequent requests are not transferred to another server in the same cluster, or from one cluster to another cluster, unless a site failover occurs; and wherein if the system is configured for use in a metropolitan area network (MAN), the plurality of clusters are distributed on a MAN wherein the session is an HTTP session, and wherein the replication channel uses an in-memory replication that operates between the first cluster and the second cluster, and allows HTTP session state to be replicated synchronously from the first cluster to the second cluster, and if the system is configured for use in a wide area network (WAN), the plurality of clusters are distributed on a WAN wherein each of the plurality of clusters has a database associated therewith, that includes session information stored therein, which the replication channel then uses to provide failover across the plurality of clusters using asynchronous data replication at periodic intervals.

6. The method of claim 5, wherein, once a request reaches a particular one of the servers in either the first cluster or the second cluster, the particular server becomes the primary server for that session, and the particular server handles subsequent requests assuming there are no failures, and wherein, after the server establishes the session, the current session state is replicated to a designated secondary server in another cluster.

7. The method of claim 5, wherein, once a client establishes a connection to a cluster, then the client maintains stickiness to that cluster, using information stored in a cookie at the client.

8. The method of claim 5, wherein the session is an HTTP session, and wherein during WAN replication, once the request a particular one of the servers in either the first cluster or the second cluster, the particular server becomes the primary server for that HTTP session, and the particular server handles subsequent requests assuming there are no failures, and wherein, after the server establishes the HTTP session, the current session state is replicated to a designated secondary server.

9. A computer readable medium, including instructions stored thereon which when read and executed by one or more computers, cause the computers to perform the steps comprising:

providing a first cluster, including a first plurality of servers executing therein that processes requests, and having a first local load balancer associated therewith that forwards session requests within the first cluster;

providing a second cluster, including a second plurality of servers executing therein that processes requests, and having a second local load balancer associated therewith that forwards session requests within the second cluster;

providing a replication channel provided between the first cluster and the second cluster, which is configured to communicate, prior to failover, session state information between servers in the first cluster and servers in the second cluster;

providing a global load balancer for distributing the session requests to the first and second clusters via their corresponding first and second local load balancers; and replicating information across the clusters, wherein, when a session is requested, a primary server is selected from the first plurality of servers in the first cluster to handle requests within the session, and wherein the primary server establishes the session and subsequently, prior to failover, replicates current session information to a secondary server selected from the second plurality of servers in the second cluster, via the replication channel, for use in enabling site failover between the plurality of clusters;

wherein, for a particular session, each of the global, first local, and second local load balancers maintains affinity for subsequent requests within the particular session to its primary server, to ensure that the subsequent requests are not transferred to another server in the same cluster, or from one cluster to another cluster, unless a site failover occurs; and wherein if the system is configured for use in a metropolitan area network (MAN), the plurality of clusters are distributed on a MAN wherein the session is an HTTP session, and wherein the replication channel uses an in-memory replication that operates between the first cluster and the second cluster, and allows HTTP session state to be replicated synchronously from the first cluster to the second cluster, and if the system is configured for use in a wide area network (WAN), the plurality of clusters are distributed on a WAN wherein each of the plurality of clusters has a database associated therewith, that includes session information stored therein, which the replication channel then uses to provide failover across the plurality of clusters using asynchronous data replication at periodic intervals.

* * * * *

UNITED STATES PATENT AND TRADEMARK OFFICE
CERTIFICATE OF CORRECTION

| | | |
|---|---|---|
| PATENT NO. | : 7,702,947 B2 | Page 1 of 1 |
| APPLICATION NO. | : 11/396517 | |
| DATED | : April 20, 2010 | |
| INVENTOR(S) | : Prasad Peddada | |

It is certified that error appears in the above-identified patent and that said Letters Patent is hereby corrected as shown below:

In column 3, line 8, delete "LANS." and insert -- LANs. --, therefor.

In column 3, line 49, delete "28,30." and insert -- 28, 30. --, therefor.

In column 4, line 45, delete "reliablity" and insert -- reliability --, therefor.

In column 5, line 55, delete "servers 1" and insert -- server S1 --, therefor.

In column 8, line 35, delete "CD-ROMS," and insert -- CD-ROMs, --, therefor.

In column 9-10, Table 1, column 4, line 8, delete "the a" and insert -- the --, therefor.

In column 9-10, Table 1, column 4, line 28, delete "2." and insert -- 2 --, therefor.

In column 9-10, Table 1, column 4, line 56, delete "2.." and insert -- 2. --, therefor.

In column 11, Table 2, column 4, line 14, after "server" insert -- . --.

Signed and Sealed this
Nineteenth Day of April, 2011

David J. Kappos
*Director of the United States Patent and Trademark Office*